United States Patent
Gonze et al.

(10) Patent No.: US 9,540,987 B2
(45) Date of Patent: Jan. 10, 2017

(54) SYSTEM AND METHOD FOR DIAGNOSING A FAULT IN A PARTITIONED COOLANT VALVE

(71) Applicant: GM Global Technology Operations LLC, Detroit, MI (US)

(72) Inventors: Eugene V. Gonze, Pinckney, MI (US); Vijay Ramappan, Novi, MI (US); Yue-Ming Chen, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 183 days.

(21) Appl. No.: 14/495,037

(22) Filed: Sep. 24, 2014

(65) Prior Publication Data

US 2016/0047292 A1  Feb. 18, 2016

Related U.S. Application Data

(60) Provisional application No. 62/036,814, filed on Aug. 13, 2014.

(51) Int. Cl.
    *G01B 21/16*  (2006.01)
    *F01P 7/14*   (2006.01)
    *F16K 5/08*   (2006.01)

(52) U.S. Cl.
    CPC . *F01P 7/14* (2013.01); *F16K 5/08* (2013.01); *F01P 2007/146* (2013.01); *G01B 21/16* (2013.01)

(58) Field of Classification Search
    CPC ...... F01P 2007/146; F16L 37/56; G01B 21/16
    (Continued)

(56) References Cited

U.S. PATENT DOCUMENTS 6,568,428 B2 * 5/2003 Pecci .................... F16K 27/003
                                                 137/595
6,994,316 B2 * 2/2006 Pervaiz ................ F16K 11/085
                                                 251/160

(Continued)

FOREIGN PATENT DOCUMENTS

DE  102013109365 * 3/2015 .............. F01P 7/16
JP  2007023989 A    2/2007

(Continued)

OTHER PUBLICATIONS

U.S. Appl. No. 14/494,904, filed Sep. 24, 2014, Gonze et al.
U.S. Appl. No. 14/495,141, filed Sep. 24, 2014, Gonze et al.
U.S. Appl. No. 14/495,265, filed Sep. 24, 2014, Gonze et al.

*Primary Examiner* — Peter Macchiarolo
*Assistant Examiner* — Anthony W Megna Fuentes

(57) ABSTRACT

A system according to the principles of the present disclosure includes a coolant valve, a valve control module, and a fault diagnostic module. The coolant valve includes a first valve chamber, a second valve chamber, and a partition disposed between the first and second valve chambers. The coolant valve further includes a first end stop disposed on a first outer perimeter surface of the first valve chamber and a second end stop disposed on a second outer perimeter surface of the second valve chamber. The valve control module rotates the coolant valve in a first direction and in a second direction that is opposite from the first direction. The fault diagnostic module diagnoses a fault in the coolant valve based on a measured position of the coolant valve as the coolant valve is rotated in the first and second directions.

20 Claims, 5 Drawing Sheets

(58) Field of Classification Search
USPC .................... 73/114.68; 137/594–595, 637.5
See application file for complete search history.

(56) References Cited

U.S. PATENT DOCUMENTS

| | | |
|---|---|---|
| 2003/0019442 A1 | 1/2003 | Yoshikawa et al. |
| 2004/0035194 A1 | 2/2004 | Wakahara |
| 2012/0296547 A1 | 11/2012 | Bialas et al. |
| 2015/0027572 A1* | 1/2015 | Morein ............... F16K 11/0876 137/625.19 |
| 2015/0053777 A1 | 2/2015 | Iwasaki |

FOREIGN PATENT DOCUMENTS

| | | |
|---|---|---|
| JP | 2011089480 A | 5/2011 |
| JP | 2013194716 A | 9/2013 |

* cited by examiner

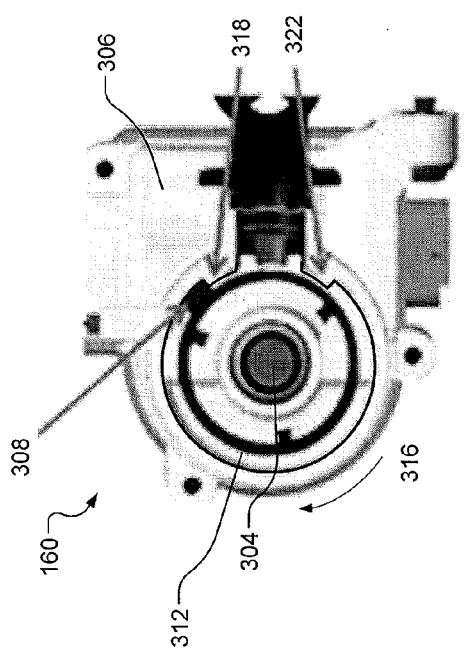
FIG. 3
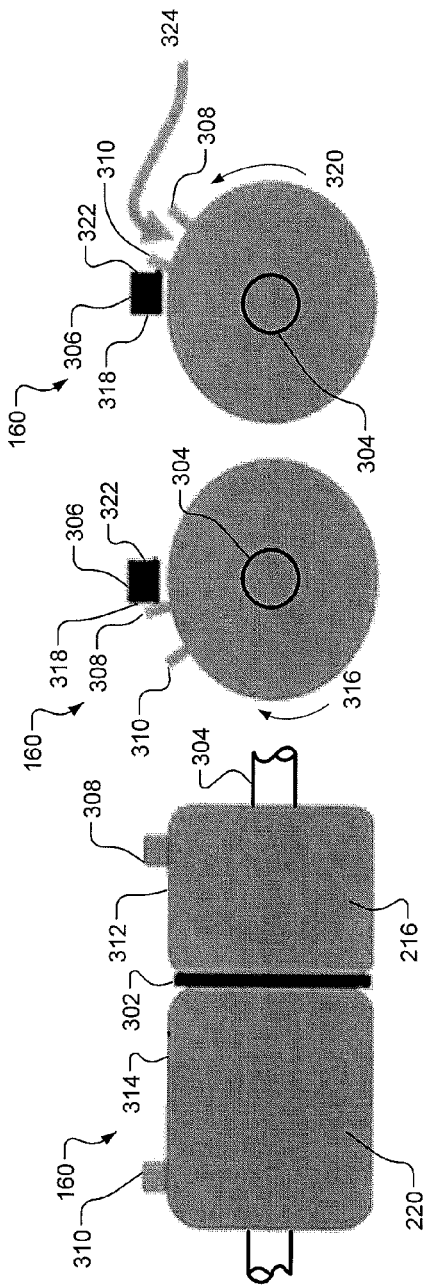
FIG. 4
FIG. 5A
FIG. 5B

SYSTEM AND METHOD FOR DIAGNOSING A FAULT IN A PARTITIONED COOLANT VALVE

CROSS-REFERENCE TO RELATED APPLICATIONS

This application claims the benefit of U.S. Provisional Application No. 62/036,814, filed on Aug. 13, 2014. The disclosure of the above application is incorporated herein by reference in its entirety.

This application is related to U.S. patent application Ser. No. 14/494,904 which is filed on the same day as this application and claims the benefit of U.S. Provisional Application No. 62/036,766 filed on Aug. 13, 2014; Ser. No. 14/495,141 filed on on the same day as this application and claims the benefit of U.S. Provisional Application No. 62/036,833 filed on Aug. 13, 2014; and Ser. No. 14/495,265 filed on the same day as this application and claims the benefit of U.S. Provisional Application No. 62/036,862 filed on Aug. 13, 2014. The entire disclosures of the above applications are incorporated herein by reference.

FIELD

The present disclosure relates to internal combustion engines, and more specifically, to systems and methods for diagnosing a fault in a partitioned coolant valve.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An internal combustion engine combusts air and fuel within cylinders to generate drive torque. Combustion of air and fuel also generates heat and exhaust. Exhaust produced by an engine flows through an exhaust system before being expelled to atmosphere.

Excessive heating may shorten the lifetime of the engine, engine components, and/or other components of a vehicle. As such, vehicles that include an internal combustion engine typically include a radiator that is connected to coolant channels within the engine. Engine coolant circulates through the coolant channels and the radiator. The engine coolant absorbs heat from the engine and carries the heat to the radiator. The radiator transfers heat from the engine coolant to air passing the radiator. The cooled engine coolant exiting the radiator is circulated back to the engine.

SUMMARY

A system according to the principles of the present disclosure includes a coolant valve, a valve control module, and a fault diagnostic module. The coolant valve includes a first valve chamber, a second valve chamber, and a partition disposed between the first and second valve chambers. The coolant valve further includes a first end stop disposed on a first outer perimeter surface of the first valve chamber and a second end stop disposed on a second outer perimeter surface of the second valve chamber. The valve control module rotates the coolant valve in a first direction and in a second direction that is opposite from the first direction. The fault diagnostic module diagnoses a fault in the coolant valve based on a measured position of the coolant valve as the coolant valve is rotated in the first and second directions.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3 is a section view of a partitioned coolant valve according to the principles of the present disclosure;

FIG. 4 is a side view of the partitioned coolant valve of FIG. 3;

FIGS. 5A and 5B are front views of the partitioned coolant valve of FIG. 3 in two different positions;

In the drawings, reference numbers may be reused to identify similar and/or identical elements.

DETAILED DESCRIPTION

Conventionally, multiple coolant valves are used to control coolant flow in an engine system. For example, one coolant valve may be used to control coolant flow between an engine and a radiator, and another coolant valve may be used to control coolant flow between a transmission heat exchanger and a coolant pump. Each coolant valve may include a housing and a chamber with a single input and a single output, and the chamber may be rotated within the housing to block or allow flow through the input.

Recently, coolant valves having multiple inputs and multiple outputs have been developed to control coolant flow in an engine system. A single valve having multiple inputs and multiple outlets typically costs less than multiple valves. A multiple input, multiple outlet valve may be rotated to adjust coolant flow into and out of the valve.

A partitioned coolant valve is one type of a multiple input, multiple outlet valve. A partitioned coolant valve includes two or more valve chambers that are separated by a partition and that are attached to and rotated with a common shaft. The valve chambers may include separate inputs and separate outputs to control coolant flow to various devices in fluid communication with the partitioned coolant valve.

A partitioned coolant valve may be controlled based on a measured position of the coolant valve. The position of the coolant valve may be measured by detecting the position of the shaft in the coolant valve. In some cases, the valve chambers may separate from the shaft. However, if the valve position is measured by detecting the position of the shaft, the measured valve position may not indicate a separation between the valve chambers and the shaft during normal actuation of the coolant valve.

A system and method according to the present disclosure diagnoses faults in a partitioned coolant valve, such as a valve chamber of the coolant valve separating from a shaft of the coolant valve, based on a measured position of the coolant valve. In one example, the coolant valve includes first and second chambers attached to a common shaft and first and second end stops disposed on outer perimeter surfaces of the first and second chambers, respectively. The system and method determines that the first chamber separated from the shaft when the measured valve position indicates that the coolant valve rotated past the point of contact between the first end stop and a first stop surface on a housing of the coolant valve. The system and method determines that the second chamber separated from the shaft when the measured valve position indicates that the coolant valve rotated past the point of contact between the second end stop and a second stop surface on the housing.

Figure 1:
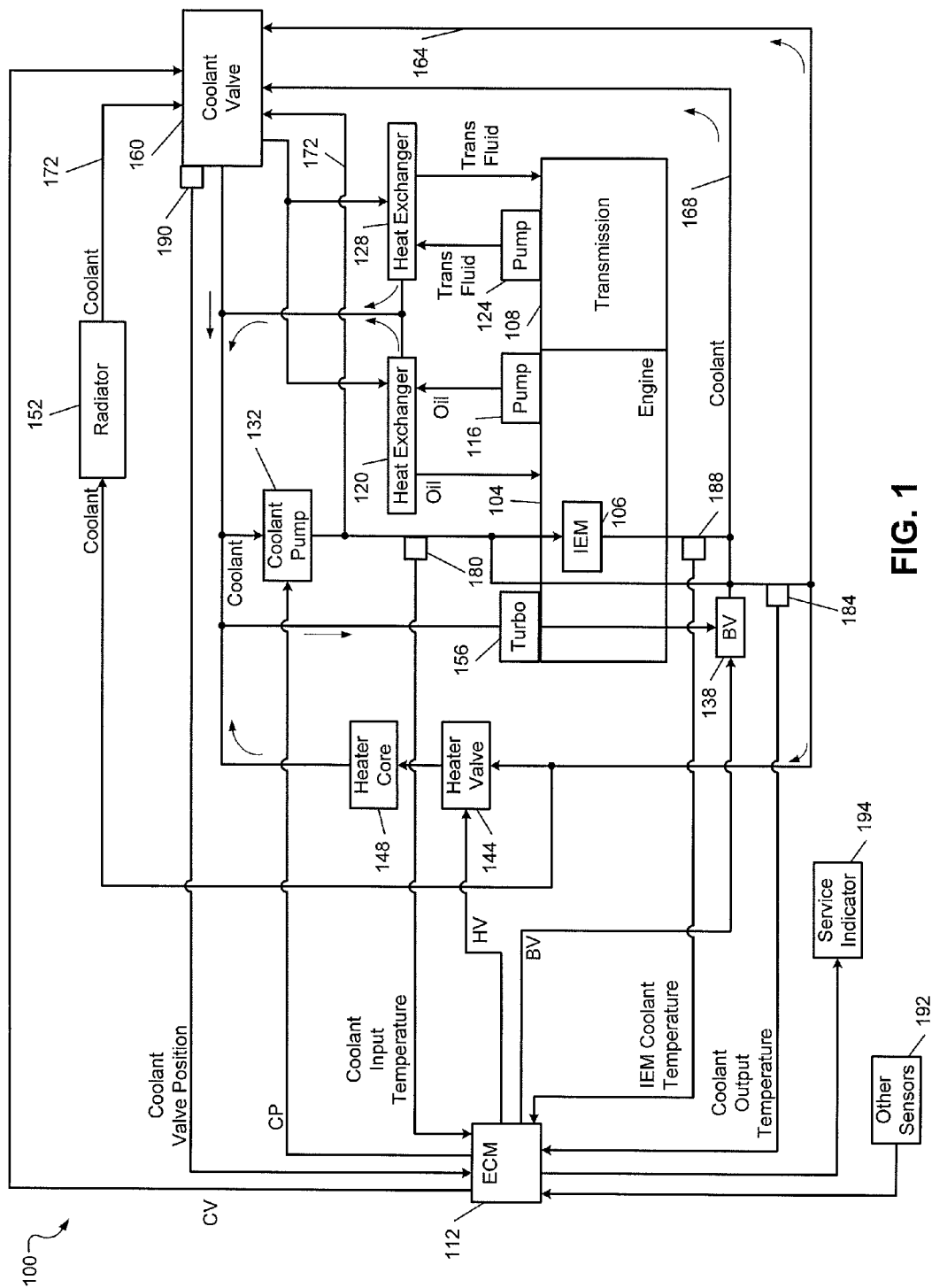
FIG. 1 is a functional block diagram of an example vehicle system according to the principles of the present disclosure.

Referring now to FIG. 1, an example vehicle system 100 includes an engine 104. The engine 104 combusts a mixture of air and fuel within cylinders to generate drive torque. An integrated exhaust manifold (IEM) 106 receives exhaust output from the cylinders and is integrated with a portion of the engine 104, such as a head portion of the engine 104.

The engine 104 outputs torque to a transmission 108. The transmission 108 transfers torque to one or more wheels of a vehicle via a driveline (not shown). An engine control module (ECM) 112 may control one or more engine actuators to regulate the torque output of the engine 104.

An engine oil pump 116 circulates engine oil through the engine 104 and a first heat exchanger 120. The first heat exchanger 120 may be referred to as an (engine) oil cooler or an oil heat exchanger (HEX). When the engine oil is cold, the first heat exchanger 120 may transfer heat to engine oil within the first heat exchanger 120 from coolant flowing through the first heat exchanger 120. When the engine oil is warm, the first heat exchanger 120 may transfer heat from the engine oil to coolant flowing through the first heat exchanger 120 and/or to air passing the first heat exchanger 120.

A transmission fluid pump 124 circulates transmission fluid through the transmission 108 and a second heat exchanger 128. The second heat exchanger 128 may be referred to as a transmission cooler or as a transmission heat exchanger. When the transmission fluid is cold, the second heat exchanger 128 may transfer heat to transmission fluid within the second heat exchanger 128 from coolant flowing through the second heat exchanger 128. When the transmission fluid is cold, the second heat exchanger 128 may transfer heat from the transmission fluid to coolant flowing through the second heat exchanger 128 and/or to air passing the second heat exchanger 128.

The engine 104 includes a plurality of channels through which engine coolant ("coolant") can flow. For example, the engine 104 may include one or more channels through the head portion of the engine 104, one or more channels through a block portion of the engine 104, and/or one or more channels through the IEM 106. The engine 104 may also include one or more other suitable coolant channels.

When a coolant pump 132 is on, the coolant pump 132 pumps coolant to various channels. While the coolant pump 132 is shown and will be discussed as an electric coolant pump, the coolant pump 132 may alternatively be mechanically driven (e.g., by the engine 104) or another suitable type of variable output coolant pump.

A block valve (BV) 138 may regulate coolant flow out of (and therefore through) the block portion of the engine 104. A heater valve 144 may regulate coolant flow to (and therefore through) a third heat exchanger 148. The third heat exchanger 148 may also be referred to as a heater core. Air may be circulated past the third heat exchanger 148, for example, to warm a passenger cabin of the vehicle.

Coolant output from the engine 104 also flows to a fourth heat exchanger 152. The fourth heat exchanger 152 may be referred to as a radiator. The fourth heat exchanger 152 transfers heat to air passing the fourth heat exchanger 152. A cooling fan (not shown) may be implemented to increase airflow passing the fourth heat exchanger 152.

Various types of engines may include one or more turbochargers, such as turbocharger 156. Coolant may be circulated through a portion of the turbocharger 156, for example, to cool the turbocharger 156.

Figure 2:
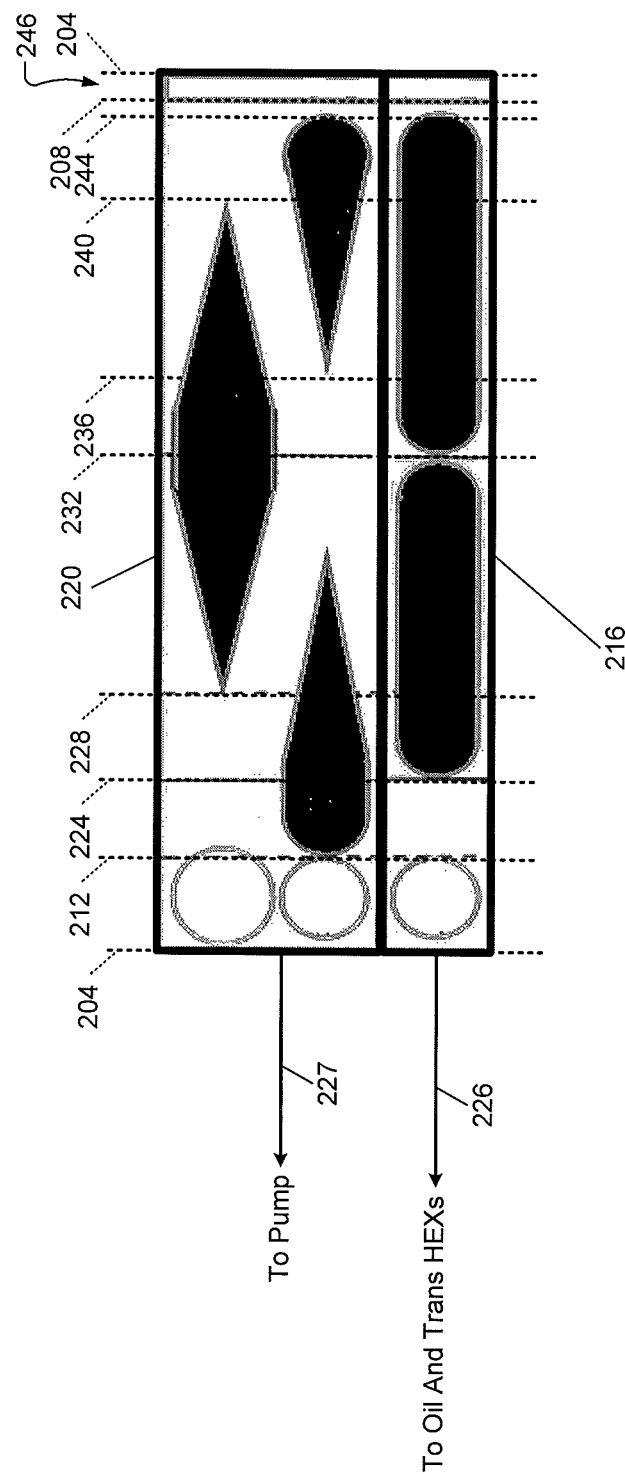
FIG. 2 is an example diagram illustrating coolant flow to and from a coolant valve at various positions of the coolant valve.

A coolant valve 160 may include a multiple input, multiple output valve or one or more other suitable valves. In various implementations, the coolant valve 160 may be partitioned and have two or more separate valve chambers. FIG. 2 illustrates coolant flow to and from an example of the coolant valve 160 where the coolant valve 160 includes two valve chambers. Although FIG. 2 depicts the coolant valve 160 as including two valve chambers, the coolant valve 160 may include more than two valve chambers. The ECM 112 controls actuation of the coolant valve 160.

Referring now to FIGS. 1 and 2, the coolant valve 160 can be rotated between two end positions 204 and 208. Although the coolant valve 160 may be spherical or cylindrical, FIG. 2 depicts the coolant valve 160 as flat for illustration purposes only. Since the coolant valve 160 is illustrated in this manner, the end position 204 appears twice in FIG. 2 even though the end position 204 is actually a single rotational position of the coolant valve 160. The end position 204 shown on the left side of FIG. 2 corresponds to a valve position of 0 degrees. The end position 204 shown on the right side of FIG. 2 corresponds to a valve position of 360 degrees.

When the coolant valve 160 is positioned between the end position 204 and a first position 212, coolant flow into a first chamber 216 is blocked, and coolant flow into a second chamber 220 is blocked. The coolant valve 160 outputs coolant from the first chamber 216 to the first heat exchanger 120 and the second heat exchanger 128 as indicated by 226. The coolant valve 160 outputs coolant from the second chamber 220 to the coolant pump 132 as indicated by 227.

When the coolant valve 160 is positioned between the first position 212 and a second position 224, coolant flow into the first chamber 216 is blocked and coolant output by the engine 104 flows into the second chamber 220 via a first coolant path 164. Coolant flow into the second chamber 220 from the fourth heat exchanger 152, however, is blocked. The ECM 112 may actuate the coolant valve 160 to between the first and second positions 212 and 224, for example, to warm the engine oil.

When the coolant valve 160 is positioned between the second position 224 and a third position 228, coolant output by the IEM 106 via a second coolant path 168 flows into the first chamber 216, coolant output by the engine 104 flows into the second chamber 220 via the first coolant path 164, and coolant flow into the second chamber 220 from the fourth heat exchanger 152 is blocked. The ECM 112 may actuate the coolant valve 160 to between the second and third positions 224 and 228, for example, to warm the engine oil and the transmission fluid.

When the coolant valve 160 is positioned between the third position 228 and a fourth position 232, coolant output by the IEM 106 via the second coolant path 168 flows into the first chamber 216, coolant output by the engine 104 flows into the second chamber 220 via the first coolant path 164, and coolant output by the fourth heat exchanger 152 flows into the second chamber 220. Coolant flow into the first chamber 216 from the coolant pump 132 via a third coolant path 172 is blocked when the coolant valve 160 is between the end position 204 and the fourth position 232. The ECM 112 may actuate the coolant valve 160 to between the third and fourth positions 228 and 232, for example, to warm the engine oil and the transmission fluid.

When the coolant valve 160 is positioned between the fourth position 232 and a fifth position 236, coolant output by the coolant pump 132 flows into the first chamber 216 via the third coolant path 172, coolant flow into the second chamber 220 via the first coolant path 164 is blocked, and coolant output by the fourth heat exchanger 152 flows into the second chamber 220. When the coolant valve 160 is positioned between the fifth position 236 and a sixth position 240, coolant output by the coolant pump 132 flows into the first chamber 216 via the third coolant path 172, coolant output by the engine 104 flows into the second chamber 220 via the first coolant path 164, and coolant output by the fourth heat exchanger 152 flows into the second chamber 220.

When the coolant valve 160 is positioned between the sixth position 240 and a seventh position 244, coolant output by the coolant pump 132 flows into the first chamber 216 via the third coolant path 172, coolant output by the engine 104 flows into the second chamber 220 via the first coolant path 164, and coolant flow from the fourth heat exchanger 152 into the second chamber 220 is blocked.

Coolant flow into the first chamber 216 from the IEM 106 via the second coolant path 168 is blocked when the coolant valve 160 is between the fourth position 232 and the seventh position 244. The ECM 112 may actuate the coolant valve 160 to between the fourth and seventh positions 232 and 244, for example, to cool the engine oil and the transmission fluid. Coolant flow into the first and second chambers 216 and 220 is blocked when the coolant valve 160 is positioned between the seventh position 244 and the end position 208. The ECM 112 may attempt to actuate the coolant valve 160 to a position within a predetermined range 246 defined between the end position 208 and the end position 204, for example, for performance of one or more diagnostics.

Referring now to FIGS. 3, 4, 5A, and 5B, an example of the coolant valve 160 includes the first chamber 216, the second chamber 220, a partition 302 disposed between and separating the first and second chambers 216 and 220, a shaft 304, and a housing 306. The first and second chambers 216 and 220 are both attached to and rotate with the shaft 304. Thus, the ECM 112 may rotate the shaft 304 to rotate the first and second chambers 216 and 220, and thereby control coolant flow into and out of the first and second chambers 216 and 220.

The coolant valve 160 further includes a first end stop 308 and a second end stop 310. As shown in FIG. 4, the first end stop 308 may be disposed on an outer perimeter surface 312 of the first chamber 216 and the second end stop 310 may be disposed on an outer perimeter surface 314 of the second chamber 220. Alternatively, the first end stop 308 may be disposed on the outer perimeter surface 314 of the second chamber 220 and the second end stop 310 may be disposed on the outer perimeter surface 312 of the first chamber 216.

The ECM 112 may rotate the coolant valve 160 in a first direction 316 until the first end stop 308 contacts a first stop surface 318 on the housing 306, as shown in FIGS. 3 and 5A. The contact between the first end stop 308 and the first stop surface 318 may prevent further rotation of the coolant valve 160 in the first direction 316. The ECM 112 may rotate the coolant valve 160 in a second direction 320 until the second end stop 310 contacts a second stop surface 322 on the housing 306, as shown in FIG. 5B. The contact between the second end stop 310 and the second stop surface 322 may prevent further rotation of the coolant valve 160 in the second direction 320.

With additional reference to FIG. 2, the coolant valve 160 may be in the end position 204 when the first end stop 308 contacts the first stop surface 318 on the housing 306. In addition, the coolant valve 160 may be in the end position 208 when the second end stop 310 contacts the second stop surface 322 on the housing 306. Thus, the predetermined range 246 defined between the end positions 204 and 208 may correspond to an area 324 between the first and second end stops 308 and 310. Further, contact between the first and second ends stops 308 and 310 and the first and second stop surfaces 318 and 322, respectively, may prevent the coolant valve 160 from rotating to a position within the predetermined range 246.

Referring back to FIG. 1, a coolant input temperature sensor 180 measures a temperature of coolant input to the engine 104. A coolant output temperature sensor 184 measures a temperature of coolant output from the engine 104. An IEM coolant temperature sensor 188 measures a temperature of coolant output from the IEM 106. A coolant valve position sensor 190 measures a position of the coolant valve 160. One or more other sensors 192 may be implemented, such as an oil temperature sensor, a transmission fluid temperature sensor, one or more engine (e.g., block and/or head) temperature sensors, a radiator output temperature sensor, a crankshaft position sensor, a mass air flowrate (MAF) sensor, a manifold absolute pressure (MAP) sensor, and/or one or more other suitable vehicle sensors. One or more other heat exchangers may also be implemented to aid in cooling and/or warming of vehicle fluid(s) and/or components.

Output of the coolant pump 132 varies as the pressure of coolant input to the coolant pump 132 varies. For example, at a given speed of the coolant pump 132, the output of the coolant pump 132 increases as the pressure of coolant input to the coolant pump 132 increases, and vice versa. The position of the coolant valve 160 varies the pressure of coolant input to the coolant pump 132. The ECM 112 may control the speed of the coolant pump 132 based on the position of the coolant valve 160 to more accurately control the output of the coolant pump 132.

The ECM 112 diagnoses faults in the coolant valve 160 based on the coolant valve position measured by the coolant valve position sensor 190. For example, referring again to FIGS. 2, 5A, and 5B, the ECM 112 may attempt to rotate the coolant valve 160 to a position within the predetermined range 246 and diagnose a fault in the coolant valve 160 if the measured valve position is within the predetermined range 246. The ECM 112 may set a diagnostic trouble code (DTC) and/or activate a service indicator 194 when a fault in the coolant valve 160 is diagnosed. When activated, the service indicator 194 indicates that service is required using a visual message (e.g., text, a light, and/or a symbol), an audible message (e.g., a chime), and/or a tactile message (e.g., vibration).

Figure 6:
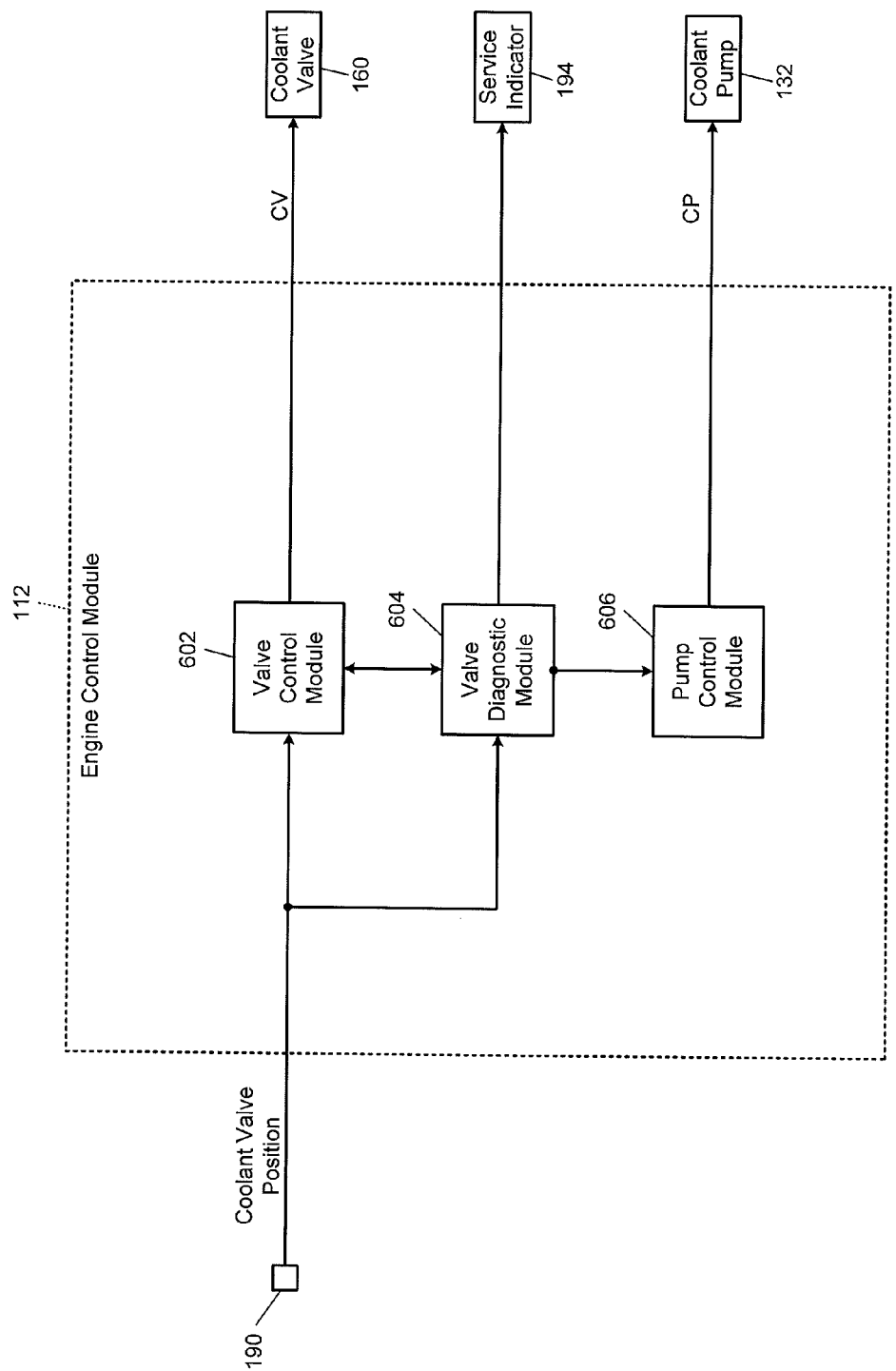
FIG. 6 is a functional block diagram of an example engine control module according to the principles of the present disclosure.

Referring now to FIG. 6, an example of the ECM 112 includes a valve control module 602, a valve diagnostic module 604, and a pump control module 606. The valve control module 602 controls the position of the coolant valve 160 by generating a coolant valve (CV) signal 608. For example, the CV signal 608 may be a voltage signal, and the valve control module 602 may control the position of the coolant valve 160 by adjusting the magnitude and/or polarity of the CV signal 608.

The valve control module 602 may adjust the position of the coolant valve 160 based on the coolant valve position measured by the coolant valve position sensor 190 and a desired valve position. For example, the valve control module 602 may adjust the position of the coolant valve 160 to minimize a difference between the measured valve position and the desired valve position. The valve control module 602 may adjust the desired valve position to adjust coolant flow into and out of the first and second chambers 216 and 220 as discussed above with reference to FIG. 2.

The valve diagnostic module 604 diagnoses faults in the coolant valve 160 based on the coolant valve position measured by the coolant valve position sensor 190 as the valve control module 602 adjusts the position of the coolant valve 160. For example, the valve diagnostic module 604 may instruct the valve control module 602 to rotate the coolant valve 160 in a desired manner. Then, as the valve control module 602 rotates the coolant valve in the desired manner, the valve diagnostic module 604 may diagnose faults in the coolant valve 160 based on the measured valve position. The valve diagnostic module 604 may perform diagnostics on the coolant valve 160 in this manner when the engine 104 is initially started (e.g., immediately after key-on) and/or when the engine 104 is off (e.g., immediately after key-off or an automatic stop).

The valve diagnostic module 604 may diagnose a first fault associated with the first chamber 216 of the coolant valve 160 by instructing the valve control module 602 to rotate the coolant valve 160 in the first direction 316. In turn, the valve control module 602 may rotate the coolant valve 160 in the first direction 316 at a first speed. The first speed may be a predetermined speed (e.g., 180 degrees per second) and/or a maximum speed of the coolant valve 160.

When the measured valve position is within a first range of the end position 204, the valve control module 602 may decrease the speed of the coolant valve 160 to a second speed while continuing to rotate the coolant valve 160 in the first direction 316. The first range may be predetermined, and the first end stop 308 on the first chamber 216 may be near the first stop surface 318 on the housing 306 when the measured valve position is within the first range of the end position 204. The second speed may be a predetermined speed (e.g., 30 degrees per second) and may be less than the first speed. The valve control module 602 may decrease the speed of the coolant valve 160 to the second speed when the first end stop 308 is near the first stop surface 318 to avoid separating the first end stop 308 from the first chamber 216.

The valve diagnostic module 604 may diagnose the first fault if the measured valve position indicates that the coolant valve 160 rotated past the end position 204 (i.e., past the point of contact between the first end stop 308 and the first stop surface 318). For example, the valve diagnostic module 604 may determine that the first chamber 216 separated from the shaft 304 and/or that the first end stop 308 separated from the first chamber 216. The valve diagnostic module 604 may set a first DTC and/or activate the service indicator 194 when the first fault is diagnosed.

In addition, the valve diagnostic module 604 may instruct the pump control module 606 to increase the capacity of the coolant pump 132 when the first fault is diagnosed. The pump control module 606 may adjust the capacity of the coolant pump 132 by generating a coolant pump (CP) signal 610. For example, the CP signal 610 may be a voltage signal, and the pump control module 606 may adjust the capacity of the coolant pump 132 by adjusting the magnitude and/or polarity of the CP signal 610.

The valve diagnostic module 604 may diagnose a second fault associated with the second chamber 220 of the coolant valve 160 by instructing the valve control module 602 to rotate the coolant valve 160 in the second direction 320. In turn, the valve control module 602 may rotate the coolant valve 160 in the second direction 320 at the first speed.

When the measured valve position is within the first range of the end position 208, the valve control module 602 may decrease the speed of the coolant valve 160 to the second speed while continuing to rotate the coolant valve 160 in the second direction 320. The second end stop 310 on the second chamber 220 may be near the second stop surface 322 on the housing 306 when the measured valve position is within the first range of the end position 208. The valve control module 602 may decrease the speed of the coolant valve 160 to the second speed when the second end stop 310 is near the second stop surface 322 to avoid separating the second end stop 310 from the second chamber 220.

The valve diagnostic module 604 may diagnose the second fault if the measured valve position indicates that the coolant valve 160 rotated past the end position 208 (i.e., past the point of contact between the second end stop 310 and the second stop surface 322). For example, the valve diagnostic module 604 may determine that the second chamber 220 separated from the shaft 304 and/or that the second end stop 310 separated from the second chamber 220. The valve diagnostic module 604 may set a second DTC and/or activate the service indicator 194 when the second fault is diagnosed. In addition, the valve diagnostic module 604 may instruct the pump control module 606 to increase the capacity of the coolant pump 132 when the second fault is diagnosed.

Figure 7:
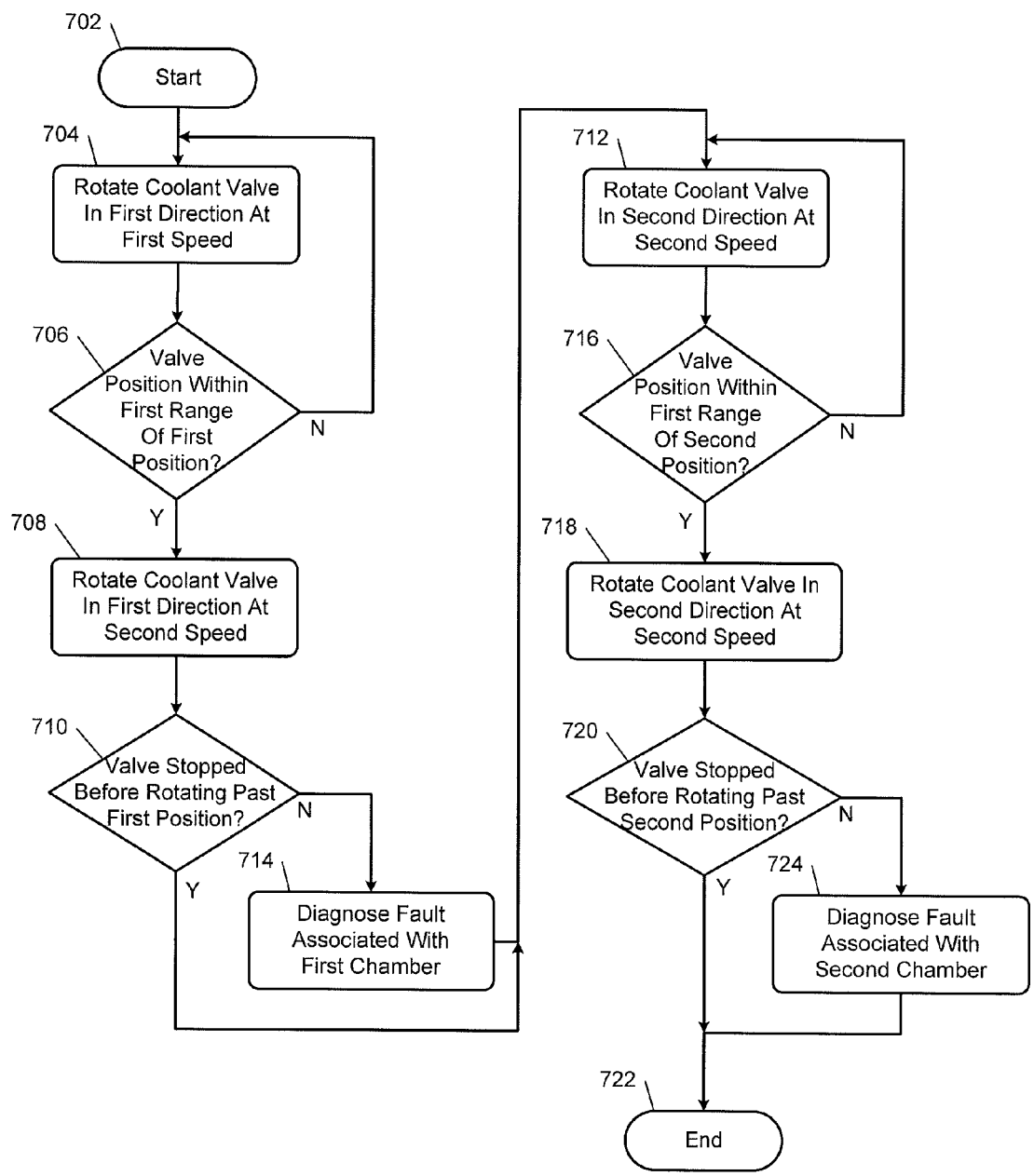
FIG. 7 is a flowchart illustrating an example method of diagnosing a fault in a partitioned coolant valve according to the principles of the present disclosure.

Referring now to FIG. 7, an example method of diagnosing faults in a partitioned coolant valve begins at 702. The coolant valve may include a multiple input, multiple output valve and may be rotatable to control coolant flow into and out of the coolant valve. The coolant valve may include a first chamber, a second chamber, and a partition disposed between and separating the first and second chambers. The first and second chambers may be fixed to and rotate with a common shaft. A first end stop may be disposed on an outer perimeter surface of the first chamber, and a second end stop may be disposed on an outer perimeter surface of the second chamber.

At 704, the method rotates the coolant valve in a first direction at a first speed. The first speed may be a predetermined speed (e.g., 180 degrees per second) and may be a maximum speed of the coolant valve. As the coolant valve is rotated in the first direction, the coolant valve approaches a first position in which the first end stop on the first chamber contacts a first stop surface on a housing of the coolant valve.

At 706, the method determines whether a measured position of the coolant valve is within a first range of the first position. If the measured valve position is within the first range of the first position, the method continues at 708 and decreases the speed of the coolant valve to a second speed while continuing to rotate the coolant valve in the first direction. Otherwise, the method continues to rotate the coolant valve in the first direction at the first speed. The second speed may be a predetermined speed (e.g., 30 degrees per second) and may be less than the first speed.

At 710, the method determines whether the measured valve position indicates that the coolant valve stopped rotating before rotating past the first position. In other words, the method determines whether the coolant valve sopped rotating when the measured valve position indicates that the first end stop on the first chamber contacted the first stop surface on the housing. If the measured valve position indicates that the coolant valve stopped rotating before rotating past the first position, the method continues directly at 712. Otherwise, the method continues at 714 and diagnoses a fault associated with the first chamber. For example, the method may determine that the first chamber separated from the shaft and/or that the first end stop separated from the first chamber. The method may then continue at 712.

At 712, the method rotates the coolant valve in a second direction at the first speed. The second direction may be opposite from the first direction. As the coolant valve is rotated in the second direction, the coolant valve approaches a second position in which the second end stop on the second chamber contacts a second stop surface on the housing of the coolant valve.

At 716, the method determines whether the measured valve position is within the first range of the second position. If the measured valve position is within the first range of the second position, the method continues at 718 and decreases the speed of the coolant valve to the second speed while continuing to rotate the coolant valve in the second direction. Otherwise, the method continues to rotate the coolant valve in the second direction at the first speed.

At 720, the method determines whether the measured valve position indicates that the coolant valve stopped rotating before rotating past the second position. In other words, the method determines whether the coolant valve sopped rotating when the measured valve position indicates that the second end stop on the second chamber contacted the second stop surface on the housing. If the measured valve position indicates that the coolant valve stopped rotating before rotating past the second position, the method continues directly at 722 and ends. Otherwise, before continuing at 722, the method continues at 724 and diagnoses a fault associated with the second chamber. For example, the method may determine that the second chamber separated from the shaft and/or that the second end stop separated from the second chamber.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system comprising:
  a coolant valve including a first valve chamber, a second valve chamber, a partition disposed between the first and second valve chambers, a first end stop disposed on a first outer perimeter surface of the first valve chamber, and a second end stop disposed on a second outer perimeter surface of the second valve chamber;
  a valve control module configured to rotate the coolant valve in a first direction and in a second direction that is opposite from the first direction; and
  a fault diagnostic module configured to diagnose a fault in the coolant valve based on a measured position of the coolant valve as the coolant valve is rotated in the first and second directions.

2. The system of claim 1 wherein the fault diagnostic module is configured to diagnose a first fault associated with the first valve chamber based on the measured position of the coolant valve as the coolant valve is rotated in the first direction.

3. The system of claim 1 wherein the fault diagnostic module is configured to diagnose a second fault associated with the second valve chamber based on the measured position of the coolant valve as the coolant valve is rotated in the second direction.

4. The system of claim 1 wherein the fault diagnostic module is configured to diagnose a fault in the coolant valve based on whether the measured position of the coolant valve is within a first predetermined range.

5. The system of claim 4 wherein:
  the coolant valve includes a housing having a first stop surface and a second stop surface;

the first stop surface is configured to engage the first end stop as the coolant valve is rotated in the first direction; and the second stop surface is configured to engage the second end stop as the coolant valve is rotated in the second direction.

6. The system of claim 5 wherein the first predetermined range is defined between a first valve position and a second valve position, the first valve position corresponding to contact between the first end stop and the first stop surface, the second valve position corresponding to contact between the second end stop and the second stop surface.

7. The system of claim 6 wherein:
the valve control module is configured to rotate the coolant valve at a first speed when the measured position of the coolant valve is outside of a second predetermined range of the first and second valve positions;
the valve control module is configured to rotate the coolant valve at a second speed when the measured position of the coolant valve is within the second predetermined range of the first and second valve positions; and
the second speed is less than the first speed.

8. The system of claim 6 wherein the first and second valve chambers are fixed to a common shaft and the valve control module is configured to rotate the shaft to rotate the coolant valve.

9. The system of claim 8 wherein the fault diagnostic module is configured to determine that the first valve chamber is separated from the shaft when the measured position of the coolant valve indicates that the coolant valve rotated past the first valve position.

10. The system of claim 8 wherein the fault diagnostic module is configured to determine that the second valve chamber is separated from the shaft when the measured position of the coolant valve indicates that the coolant valve rotated past the second valve position.

11. A method comprising:
rotating a coolant valve in a first direction and in a second direction that is opposite from the first direction, the coolant valve including a first valve chamber, a second valve chamber, a partition disposed between the first and second valve chambers, a first end stop disposed on a first outer perimeter surface of the first valve chamber, and a second end stop disposed on a second outer perimeter surface of the second valve chamber; and
diagnosing a fault in the coolant valve based on a measured position of the coolant valve as the coolant valve is rotated in the first and second directions.

12. The method of claim 11 further comprising diagnosing a first fault associated with the first valve chamber based on the measured position of the coolant valve as the coolant valve is rotated in the first direction.

13. The method of claim 11 further comprising diagnosing a second fault associated with the second valve chamber based on the measured position of the coolant valve as the coolant valve is rotated in the second direction.

14. The method of claim 11 further comprising diagnosing a fault in the coolant valve based on whether the measured position of the coolant valve is within a first predetermined range.

15. The method of claim 14 wherein:
the coolant valve includes a housing having a first stop surface and a second stop surface;
the first stop surface is configured to engage the first end stop as the coolant valve is rotated in the first direction; and
the second stop surface is configured to engage the second end stop as the coolant valve is rotated in the second direction.

16. The method of claim 15 wherein the first predetermined range is defined between a first valve position and a second valve position, the first valve position corresponding to contact between the first end stop and the first stop surface, the second valve position corresponding to contact between the second end stop and the second stop surface.

17. The method of claim 16 further comprising:
rotating the coolant valve at a first speed when the measured position of the coolant valve is outside of a second predetermined range of the first and second valve positions; and
rotating the coolant valve at a second speed when the measured position of the coolant valve is within the second predetermined range of the first and second valve positions, wherein the second speed is less than the first speed.

18. The method of claim 16 wherein the first and second valve chambers are fixed to a common shaft, the method further comprising rotating the shaft to rotate the coolant valve.

19. The method of claim 18 further comprising determining that the first valve chamber is separated from the shaft when the measured position of the coolant valve indicates that the coolant valve rotated past the first valve position.

20. The method of claim 18 further comprising determining that the second valve chamber is separated from the shaft when the measured position of the coolant valve indicates that the coolant valve rotated past the second valve position.

* * * * *